US006722680B2

(12) United States Patent
DeLong et al.

(10) Patent No.: US 6,722,680 B2
(45) Date of Patent: Apr. 20, 2004

(54) WHEELCHAIR WHEEL COVERS

(75) Inventors: Thomas A. DeLong, Mt. Pleasant, MI (US); Steven A. Fisher, Shephard, MI (US)

(73) Assignee: Chairwares, Inc., Mt. Pleasant, MI (US)

( * ) Notice: Subject to any disclaimer, the term of this patent is extended or adjusted under 35 U.S.C. 154(b) by 0 days.

(21) Appl. No.: 10/359,467

(22) Filed: Feb. 6, 2003

(65) Prior Publication Data

US 2003/0146598 A1 Aug. 7, 2003

Related U.S. Application Data

(60) Provisional application No. 60/354,615, filed on Feb. 6, 2002.

(51) Int. Cl.[7] .................................................. B60B 7/06

(52) U.S. Cl. ............................... 280/304.1; 301/37.25; 301/37.38

(58) Field of Search .......................... 280/250.1, 304.1, 280/157; 301/37.25, 37.38, 37.26, 108.5, 37.41, 37.1, 37.37

(56) References Cited

U.S. PATENT DOCUMENTS

| | | | | | |
|---|---|---|---|---|---|
| 343,379 | A | | 1/1894 | Dockins | |
| 367,629 | A | | 3/1896 | Whitehead | |
| 1,351,261 | A | * | 8/1920 | Miller | 301/37.38 |
| 1,481,363 | A | | 1/1924 | Hall | |
| 2,387,188 | A | * | 10/1945 | Springer | 280/160 |
| 2,548,070 | A | * | 4/1951 | Ryan | 40/587 |
| 3,004,798 | A | | 10/1961 | Tylle | |
| 3,924,898 | A | * | 12/1975 | Kain | 301/108.5 |
| 4,360,213 | A | | 11/1982 | Rudwick et al. | |
| 4,682,821 | A | | 7/1987 | Strazis | |
| 4,712,838 | A | | 12/1987 | Berg et al. | |
| 4,729,604 | A | | 3/1988 | Dietz | |
| 4,836,615 | A | | 6/1989 | Berg et al. | |
| 4,969,693 | A | | 11/1990 | Molson | |
| 4,978,174 | A | | 12/1990 | Nosler | |
| 4,981,329 | A | | 1/1991 | Koch et al. | |
| 5,490,342 | A | | 2/1996 | Rutterman et al. | |
| 6,047,980 | A | | 4/2000 | Margherita et al. | |
| 6,164,678 | A | | 12/2000 | Fryer | |
| 6,269,992 | B1 | | 8/2001 | Miller | |
| 2003/0102712 | A1 | * | 6/2003 | Fitzgerald | 301/37.25 |

* cited by examiner

*Primary Examiner*—Anne Marie Boehler
(74) *Attorney, Agent, or Firm*—Reising, Ethington, Barnes, Kisselle & Learman, P.C.

(57) ABSTRACT

The wheelchair wheel cover includes a cover hub, radially extending disk and an integral radially outer wall that extends axially from the disk to a cover inboard edge. The cover hub includes a bore that receives a fixed bolt. The bolt passes through a wheel bearing with an inner race and an outer race. The bolt also passes through the frame of a wheelchair and screws into a nut. When the wheel cover is non-rotating, tightening the nut forces the cover hub against an inboard washer, forces the inboard washer against the inner race and forces the inner race against the frame. If the wheel cover is to rotate a thrust bearing is provided between the head of the axle bolt and the cover hub and the inboard washer is forced toward the outer race. The disk can be flat or sculptured and protects hands and fingers.

20 Claims, 5 Drawing Sheets

WHEELCHAIR WHEEL COVERS

The disclosure incorporates wheelchair wheel covers disclosed in provisional patent application No. 60/354,615, filed Feb. 6, 2002, whose priority is claimed for this application.

TECHNICAL FIELD

The wheelchair wheel covers are journaled on a fixed axle, may be stationary or rotate with a wheel, and provide protection for the hand that rotates a wheel.

BACKGROUND OF THE INVENTION

Wheelchairs are available in a variety of sizes and shapes. Racing wheelchairs, for example, are lightweight and their driven wheels are towed in at the top to make it easier to manually rotate both wheel simultaneously. Non-racing wheelchairs generally have both large wheels journaled for rotation about a common axis.

The large diameter manually rotated wheels of wheelchairs usually have a bolt on each side that connects a wheel to the frame. These bolts generally clamp an inner bearing race to the frame of the wheelchair and hold the inner race in a fixed non-rotating position.

Each wheel of a wheelchair can be journaled on an axle by a bushing, a roller bearing, a ball bearing or a pair of ball bearings. A pair of ball bearings is generally the preferred bearing arrangement for high quality wheelchairs. The inner races of these bearings can be mounted on a common sleeve or they can be mounted directly on an axle shaft and separated by a spacer to reduce axial loading on the balls of the ball bearings. A bolt normally clamps the common sleeve of each wheel or the inner races of each bearing to the wheelchair frame and hold the inner bearing races in fixed positions relative to the wheelchair frame. The outer race or races of bearings are received in a wheel hub and rotate with the hub and the wheel secured to the hub.

Wheel covers have been mounted on the wheels of all kinds of vehicles. Some wheel covers are primarily for appearance while other wheel covers are functional. A few wheel covers are decorative and functional. Most wheel covers rotate with the wheel they are mounted upon. Wheel covers are known however that do not rotate with the wheel. The non-rotating wheel covers are generally clamped to a non-rotating axle and held in place by friction. Wheel covers that rotate are generally mounted on a wheel and rotate with the wheel.

SUMMARY OF THE INVENTION

The wheelchair wheel cover is journaled on an outboard end of a non-rotating bolt. A wheel bearing is mounted on the bolt. A nut on an inboard end of the bolt clamps an inner wheel bearing race to the wheelchair frame. The non-cylindrical head of the bolt may be received in a non-cylindrical passage in the wheel cover to prevent rotation of the wheel cover relative to the bolt when the wheel cover is non-rotatable. If the wheel cover is to rotate, the head of the bolt is received in a cylindrical bore in the wheel cover. A thrust bearing is provided between the head of the bolt and the wheel cover to reduce friction and to permit the wheel cover to rotate relative to the bolt. A finger extending axially inward from the wheel cover engages a wheel spoke and rotates the wheel cover with the wheel. A cylindrical flange on the outer edge of the wheel cover extends axially into a manual wheel drive ring. The cylindrical flange directs a person's fingers into the space between the wheel drive ring and the cylindrical flange. The portions of the wheel cover that extend axially outboard of the wheel drive ring protect a person's hands from walls, the doorframes at the side of doorways and other obstructions. The outboard portions of the wheel covers also protect walls and doorframes from the outboard ends of wheelchair axles and wheel hubs.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

Figure 6:
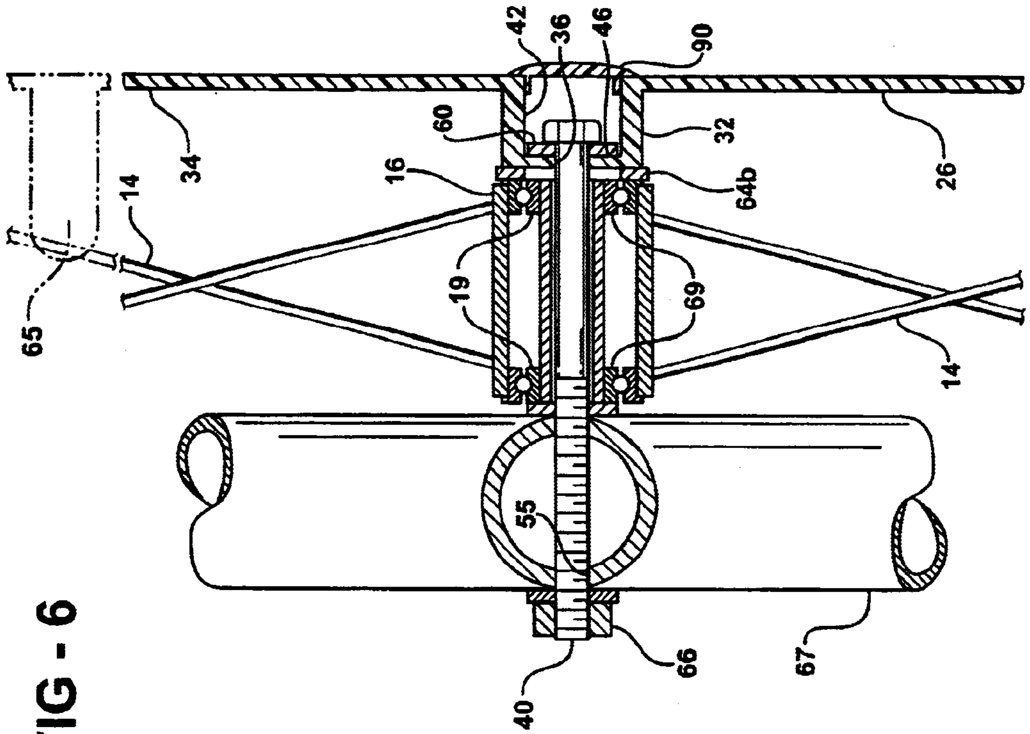
FIG. 6 is a sectional view, similar to FIG. 5, showing an inboard washer in engagement with the wheel bearing outer race.
Figure 5:
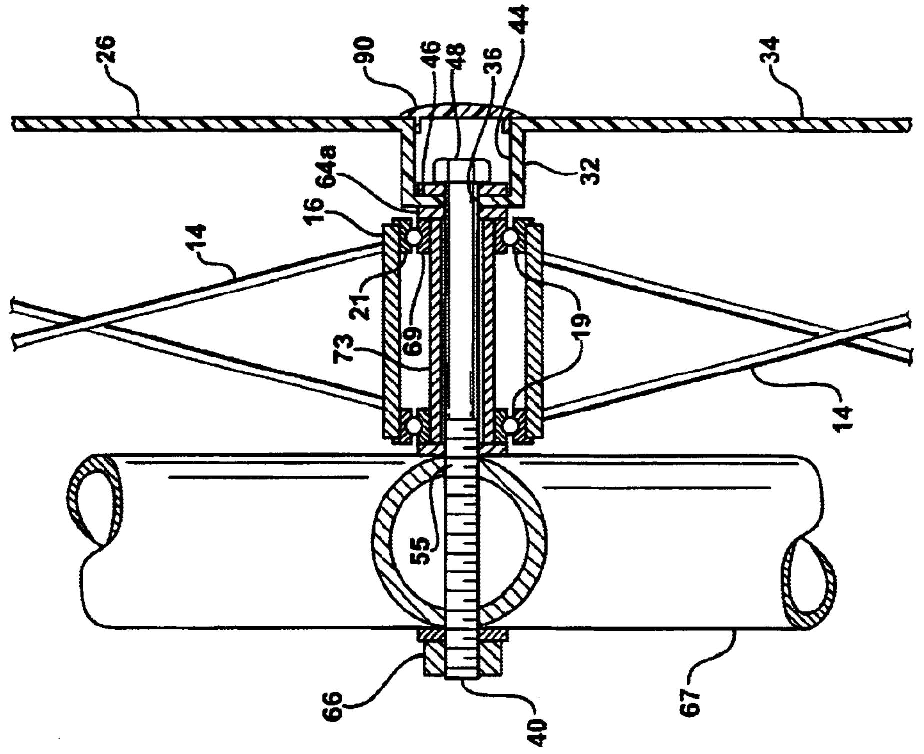
FIG. 5 is an enlarged sectional view through a wheel and wheel cover axis of rotation, with parts broken away, showing an inboard washer in engagement with the wheel bearing inner race.

Each wheelchair wheel 10 has a rim 12, radially extending spokes 14 and a central hub 16. A tire 18 is mounted on the rim 12. The tire 18 is usually a pneumatic tire but can also be a solid or hard rubber tire. Wheel bearings 19 have their outer races 21 mounted in the central hub 16. Two bearings are shown in FIGS. 5 and 6. Some wheelchairs have a single bearing. A wheel manual drive ring 20 is rigidly secured to the rim 12 by a plurality of drive ring posts 22. These posts axially space the drive ring 20 from the rim 12 to provide space for a person to grasp the drive ring 20 with his fingers F and thumb T. The outer diameter of the drive ring 20 is a little less than the outer diameter of the tire 18 to prevent contact between the drive ring and the floor or other support surface.

The wheel covers 24 and 26 have a radially outer cylindrical portion 28 that is concentric with the axis of rotation 30 of the wheel 10. A central hub 32 of the wheel covers 24 and 26 is connected to the cylindrical portion 28 by a wheel cover disc 34. The disc 34 of the wheel cover 24 is sculptured to resemble a tire and wheel of a motor vehicle. The disc 34 of the wheel cover 26 is a flat plate with its outboard surface in a plane that is perpendicular to the axis of rotation 30.

Figure 2:
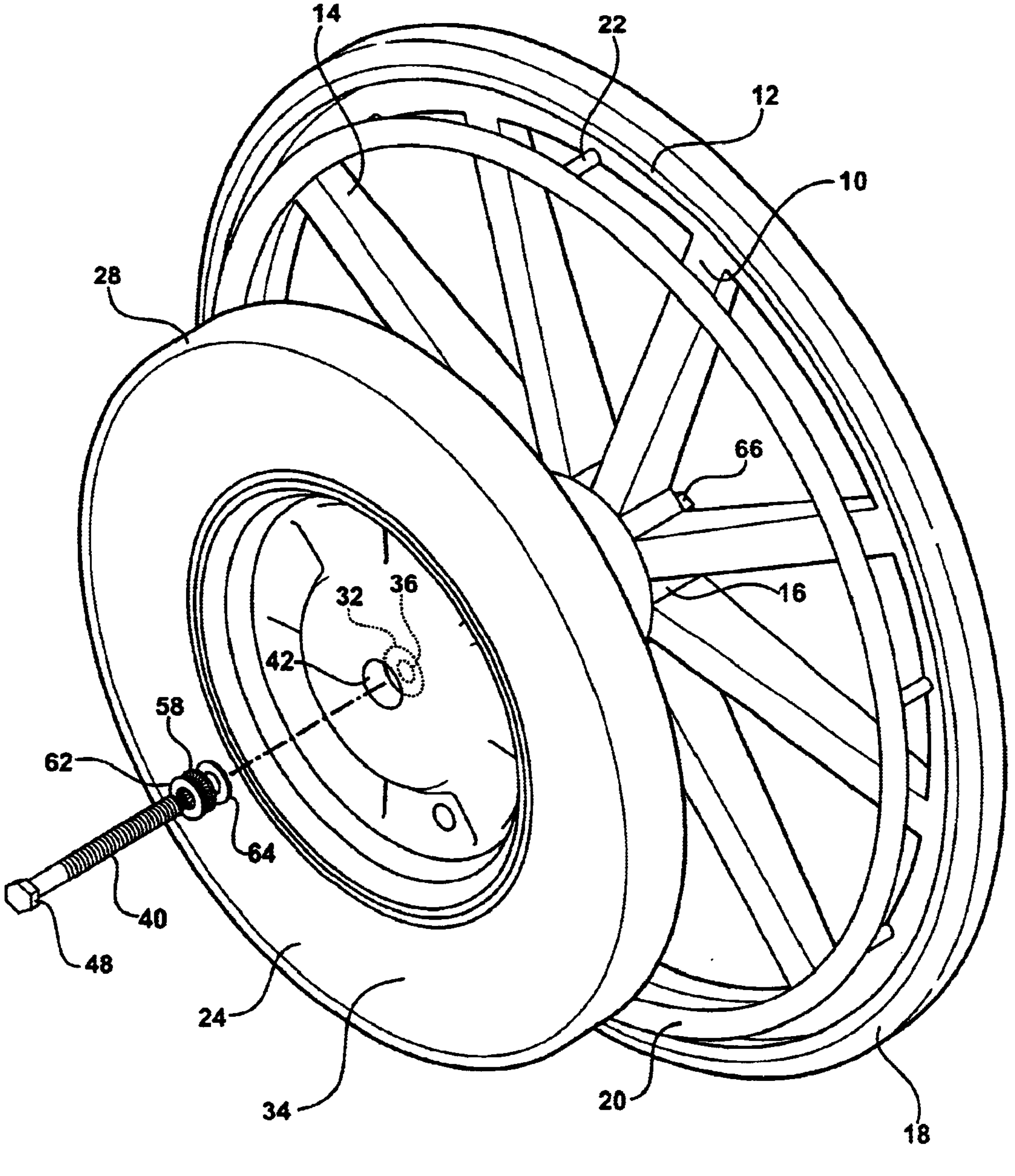
FIG. 2 is an expanded perspective view of a wheelchair wheel and a sculptured wheel cover that rotates.
Figure 3:
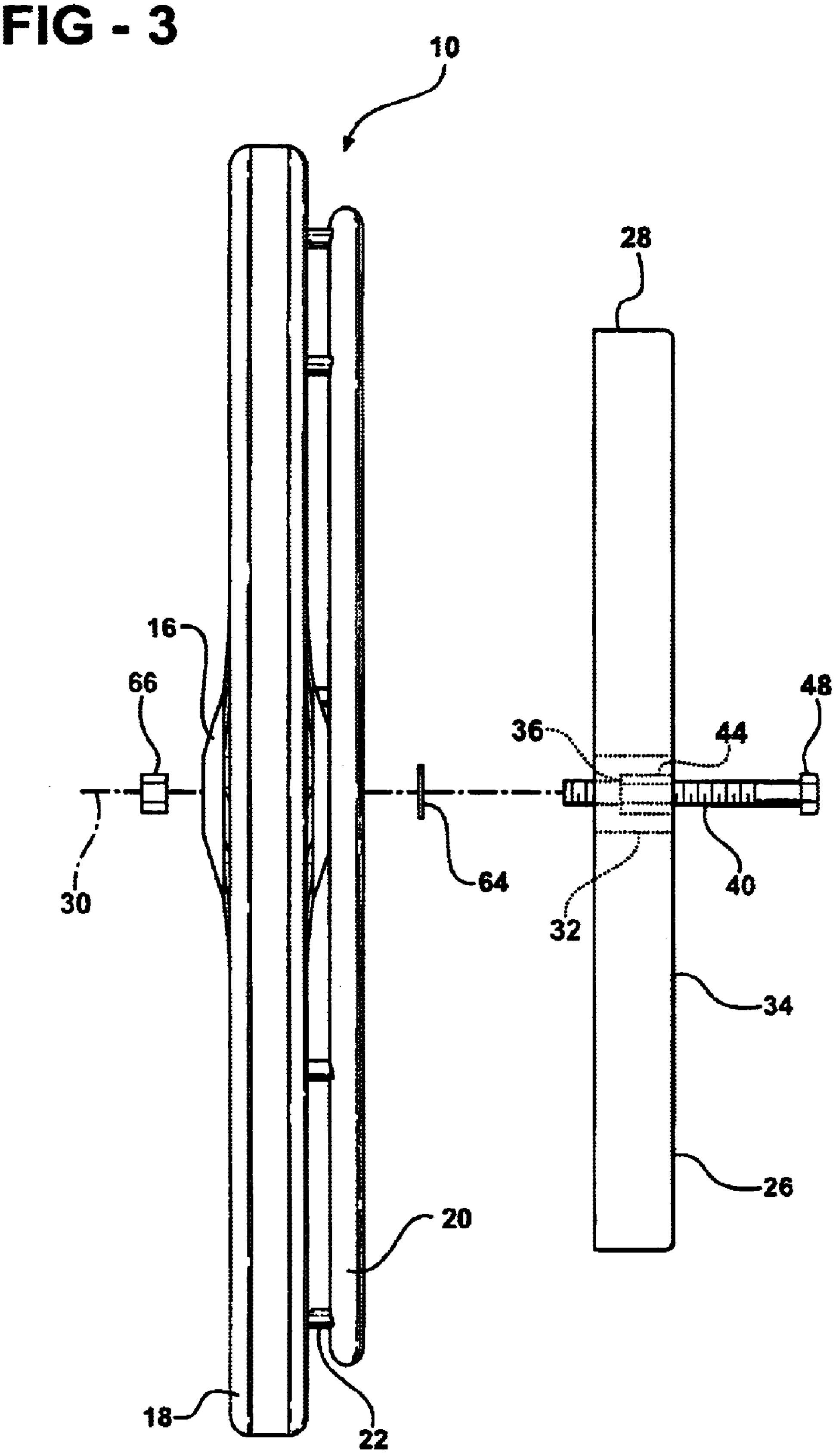
FIG. 3 is an expanded front elevational view of a wheelchair wheel and a non-sculptured wheel cover that does not rotate.

The central hub 32 of each wheel cover 24 and 26 has an inboard central bore 36 that journals the wheel covers 24 and 26 on a bolt 40. A large diameter outboard bore 42 or 44 in each hub 32 is concentric with the inboard central bore 36 and separated from the inboard bore by a flat radially extending wall 46. The outboard bore 42, shown in FIGS. 2 and 6, is a cylindrical counter bore that is larger in diameter than the head 48 of the bolt 40. The outboard bore 44 shown in FIG. 3 is a hexagon shaped bore that receives the head 48 of a bolt 40 and prevents rotation of the bolt relative to the wheel cover hub 32. The bore 44 does not need to hold the bolt head 48 however to prevent rotation of the wheel covers 24 and 26. Both wheel covers 24 and 26 can be provided with either the cylindrical outer bore 42 or the hexagon shaped outer bore 44.

Figure 1:
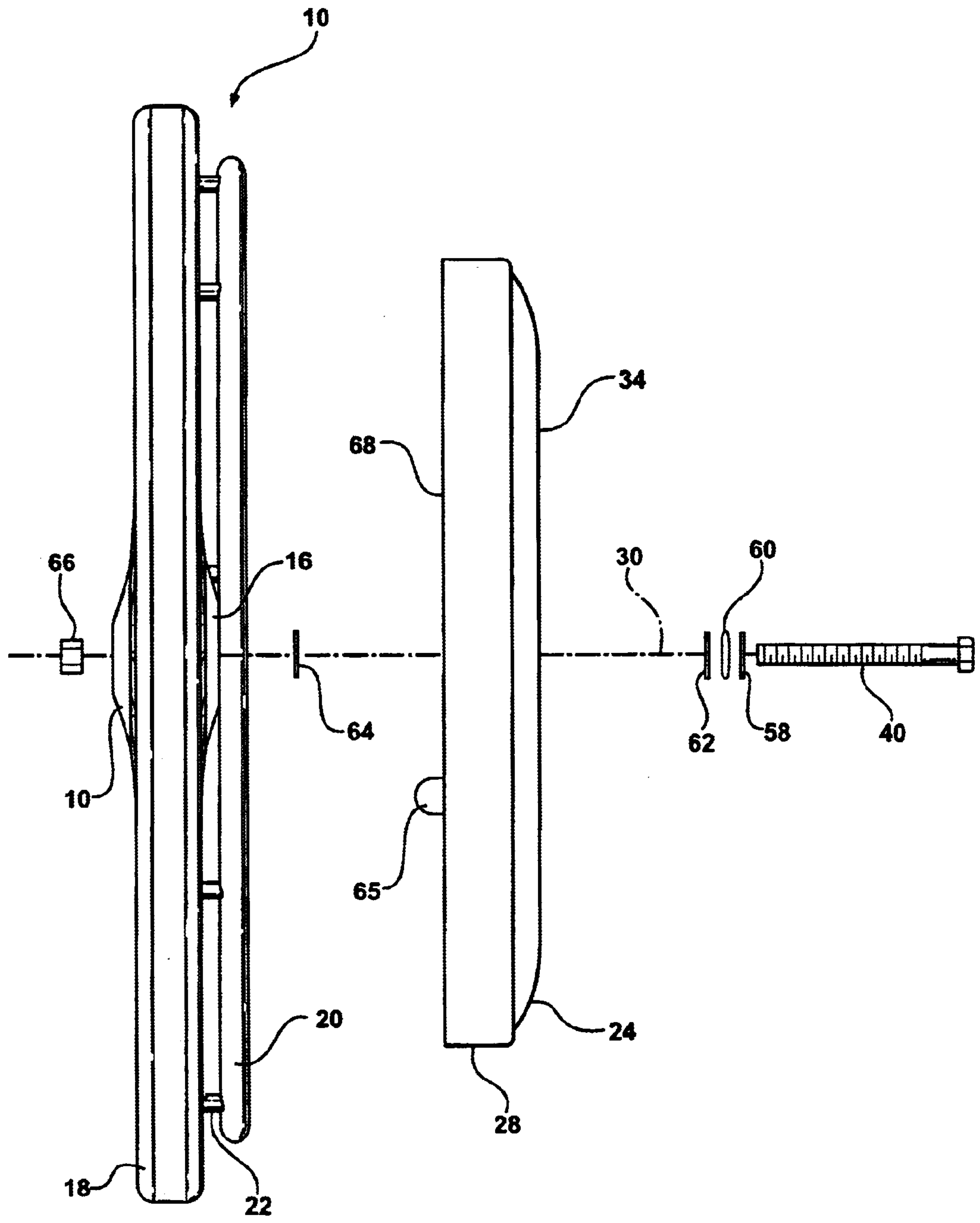
FIG. 1 is an expanded front elevational view of a wheelchair wheel and a sculptured wheel cover that rotates with the wheel.

The bolt 40, as shown in FIG. 1, passes through a washer 58, an axial thrust bearing 60, a washer 62, the central bore 36, an inboard washer 64, wheel bearings 19 in the hub 16, a passage 55 through the wheelchair frame 67 and screws into a nut 66. The thrust bearing 60 permits the wheel cover 24 to rotate relative to the bolt 40.

The bolt 40, as shown in FIG. 3, passes through the central bore 36, the hexagon head 48 is received in the hexagon shaped outboard bore 44, passes through a washer 64, wheel bearings 19 in the hub 16, through the frame 67, and is received in the nut 66. The nut 66 can be tightened to hold the wheel cover 24 or 26 with the hexagon shaped outboard bore 44 in any selected position about the axis of rotation 30.

The washers *64a* preferably seat on the inner race 69 of the wheel bearings 19 when the wheel cover 24 or 26 is not to rotate as shown in FIG. 5. The washers *64b* preferably seat on the outer race 71 of the wheel bearing 10 when the wheel cover 24 or 26 is to rotate with the wheel as shown in FIG. 6. This can be accomplished with a special washer 64. Spacer sleeves 73 can also be employed to space various components on the bolts 40. A finger 65 on a wheel cover 24 or 26 engages the spoke 14 to ensure rotation of a wheel cover that is to rotate. The finger 65 is not used when the wheel cover 24 or 26 is to be stationary.

Figure 4:
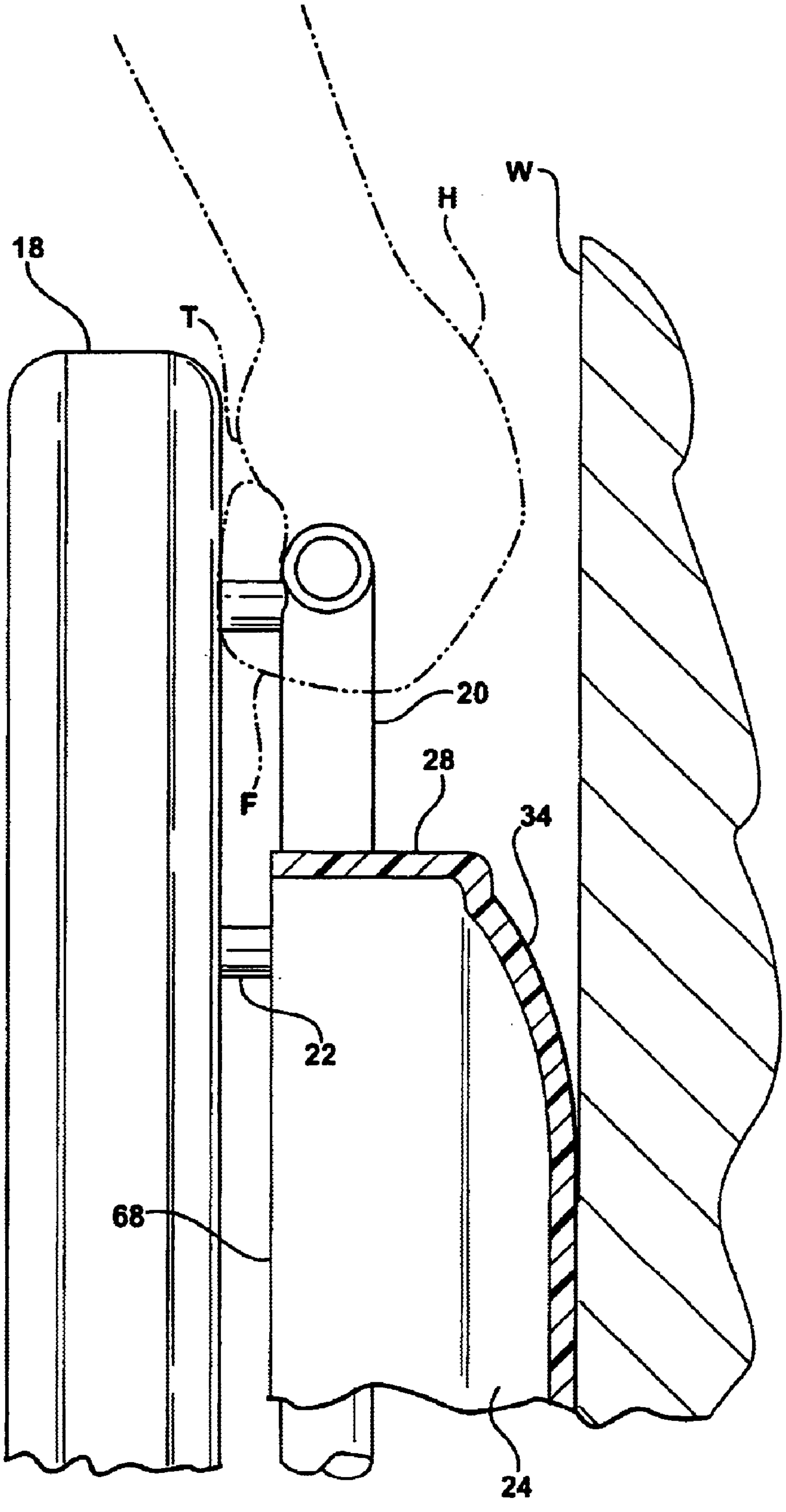
FIG. 4 is an enlarged rear vertical sectional view of the wheelchair wheel cover, with parts broken away, and an obstruction such as a door frame.

The inboard edge 68 of the wheel covers 24 and 26 is preferably a short distance from the spokes 14 when the bolt 40 and the nut 66 are tight. This positions the inboard edge 68 axially inboard of the wheel manual drive ring 20 as shown in FIG. 4. The radial space between the cylindrical portion 28 and the drive ring 20 permits easy finger F and thumb access to the drive ring. At least a portion of the wheel cover disc 34 of each wheel cover extends axially outboard from the drive ring 20 to prevent a person's hand H from being squeezed or crushed between the drive ring and a wall W, a doorway side frame, or another structure. At the same time the wheel cover discs 24 and 26 do not significantly increase the total width of a wheelchair 10 or prevent access to areas that are normally accessible to wheelchairs. The wheel cover discs 24 and 26 prevent or limit damage to furniture, walls, doorways and other objects that would occur if a wheelchair were not equipped with wheel covers 24 or 26.

The outboard bores 42 or 44 of the wheel covers 24 and 26 can be closed by plugs 90. The outboard surface of the discs 34 can be shaped and decorated as desired. The plugs 90 to cover the bolt heads 48 may be required when decorating the wheel covers 24 and 26.

The disclosed embodiment is representative of a presently preferred form of the invention, but is intended to be illustrative rather than definitive thereof. The invention is defined in the claims.

We claim:

1. A wheelchair wheel cover comprising:

a central hub having an inboard central bore that journals the central hub on a fixed axle, an outboard bore in the central hub having a larger diameter than the inboard central bore and that is concentric with the inboard central bore, and a flat radially extending wall separating the inboard central bore from the outboard bore;

a wheel cover disk portion integral with the central hub and extending radially outward from the central hub;

a radially outer cylindrical portion concentric with the inboard central bore and extending axially inward from the wheel cover disk portion to a wheel cover inboard edge;

an axle shaft having a shaft inboard end and a head end extending through the central hub with the head end inside the outboard bore;

an inboard washer received on the shaft inboard end and positioned between the central hub and an outboard bearing end of a wheel bearing of a wheelchair wheel, and wherein the shaft inboard end extends through an inner race of the wheel bearing, through a wheelchair frame and screws into a nut; and wherein tightening the nut clamps the inner race of the wheel bearing and anchors the inner race relative to the wheelchair frame.

2. A wheelchair wheel cover, as set forth in claim 1, wherein tightening the nut also clamps the wheelchair wheel cover between the outboard bearing end and the head end of the axle shaft.

3. A wheelchair wheel cover, as set forth in claim 2, wherein the inboard washer is in engagement with the inner race and an outer race of the wheel bearing is free to rotate relative to the inboard washer.

4. A wheelchair wheel cover, as set forth in claim 3, wherein the head end of the axle shaft engages the outboard bore and limits rotation of the wheelchair wheel cover.

5. A wheelchair wheel cover, as set forth in claim 1, including a first outboard washer, a second outboard washer, and a thrust bearing between the first outboard washer and the second outboard washer and wherein the first outboard washer, the thrust bearing and the second outboard washer are all mounted on the axle shaft between the head end of the axle shaft and the flat radially extending wall separating the inboard central bore from the outboard bore.

6. A wheelchair wheel cover, as set forth in claim 5, wherein the inboard washer is in engagement with an outer race on the outboard bearing end and the inboard washer is free to rotate relative to the axle shaft.

7. A wheelchair wheel cover, as set forth in claim 6, including a cover driving finger that extends axially inward past the wheel cover inboard edge of the radially outer cylindrical portion.

8. A wheelchair wheel cover, as set forth in claim 1, wherein the wheelchair wheel includes a wheel hub with a wheel hub bore that receives an outer race of the wheel bearing, a plurality of wheel spokes extending radially outward from the wheel hub, a wheel rim attached to the plurality of wheel spokes, a tire mounted on the wheel rim, a hand driven ring attached to the wheel rim, and wherein the hand driven ring is spaced radially outward from the radially outer cylindrical portion of the wheel cover and axially inward from the wheel cover disk portion of the wheel cover.

9. A wheelchair wheel cover, as set forth in claim 1, wherein the wheel cover disk portion has a disk outboard surface that is substantially flat.

10. A wheelchair wheel cover, as set forth in claim 1, wherein the wheel cover disk portion has a disk outboard surface that is sculptured.

11. A wheelchair wheel cover in combination with a wheelchair wheel comprising:

a wheel cover hub with an inboard end and an outboard end, a cover central axis of rotation, a wheel cover disk integral with the wheel cover hub and extending generally radially outward from the outboard end of the wheel cover hub, and a radially outer wall integral with an outer edge of the wheel cover disk and extending axially inward to a wheel cover inboard edge;

an axle shaft receiving bore through the wheel cover hub that is concentric with the cover central axis of rotation and a counter bore in the outboard end of the wheel cover hub and concentric with the cover central axis of rotation;

an axle bolt passing through the axle shaft receiving bore, having an axle bolt head end received in the counter bore, an axle bolt inboard end passing through an inboard washer, a wheel bearing inner race of a wheel bearing, a wheelchair frame, and screwing into a nut;

a wheel hub that receives an outer race of the wheel bearing and rotates with the outer race, a plurality of wheel spokes attached to the wheel hub, a wheel rim attached to the spokes and generally concentric with the cover central axis of rotation, a plurality of ring posts attached to the wheel rim, a tire attached to the wheel rim, and a manual drive ring attached to a free end of each plurality of ring posts and axially spaced from the wheel rim; and wherein at least a portion of the wheel cover disk is axially spaced from an outboard of a portion of the manual drive ring and a finger passage is provided between the manual drive ring and the radially outer wall of the wheel cover disk.

12. A wheelchair wheel cover, as set forth in claim 11, wherein the wheel cover inboard edge is axially positioned inboard from the manual drive ring.

13. A wheelchair wheel cover, as set forth in claim 11, wherein tightening the nut on the axle bolt clamps the wheelchair wheel cover between the wheel bearing and the axle bolt head.

14. A wheelchair wheel cover, as set forth in claim 13, wherein the inboard washer is in engagement with the inner race and the outer race of the wheel bearing is free to rotate relative to the inboard washer.

15. A wheelchair wheel cover, as set forth in claim 14, wherein the axle bolt head end engages the counter bore in the outboard end of the wheel cover hub and limits rotation of the wheelchair wheel cover.

16. A wheelchair wheel cover, as set forth in claim 11, including a first outboard washer, a second outboard washer, and a thrust bearing between the first outboard washer and the second outboard washer and wherein the first outboard washer, the thrust bearing and the second outboard washer are mounted on the axle bolt between the axle bolt head end and a counter bore end wall in the wheel cover hub.

17. A wheelchair wheel cover, as set forth in claim 16, wherein the inboard washer is in engagement with the outer race of the wheel bearing and the inboard washer is free to rotate relative to the axle bolt and the wheel bearing inner race.

18. A wheelchair wheel cover, as set forth in claim 17, including a cover driving finger that extends axially inward and engages at least one of the plurality of wheel spokes.

19. A wheelchair wheel cover, as set forth in claim 11, wherein the wheel cover disk has a disk outboard surface that is substantially flat.

20. A wheelchair wheel cover, as set forth in claim 11, wherein the wheel cover disk has a disk outboard surface that is sculptured.

* * * * *